Dec. 22, 1970   C. B. VAUGHAN   3,549,996
UNIVERSAL TESTER FOR DYNAMIC AND STATIC TESTS ON THE
OPERATING EFFICIENCY OF ELECTRICAL APPARATUS
Original Filed Jan. 15, 1962   9 Sheets-Sheet 4
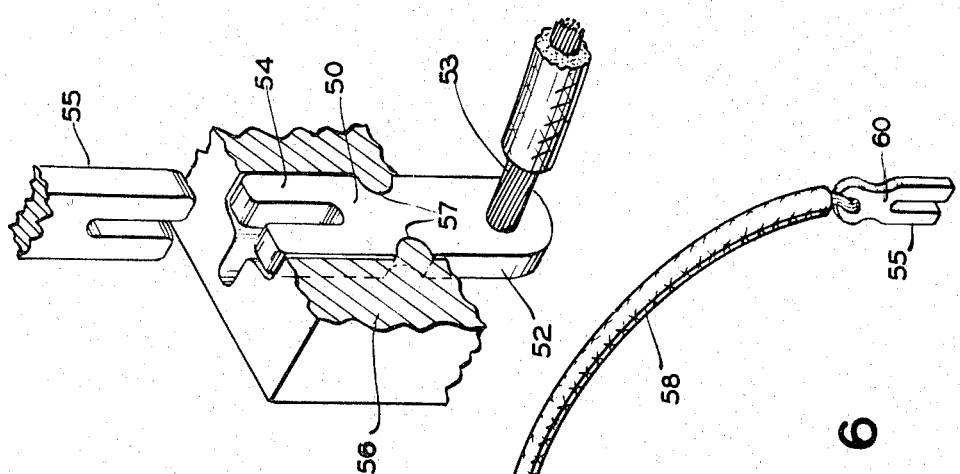
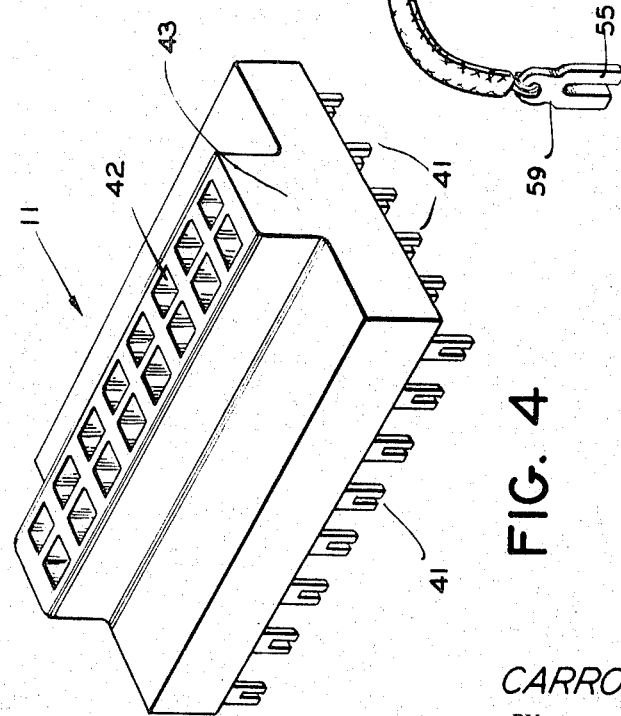
INVENTOR.
CARROLL B. VAUGHAN
BY
ATTORNEY

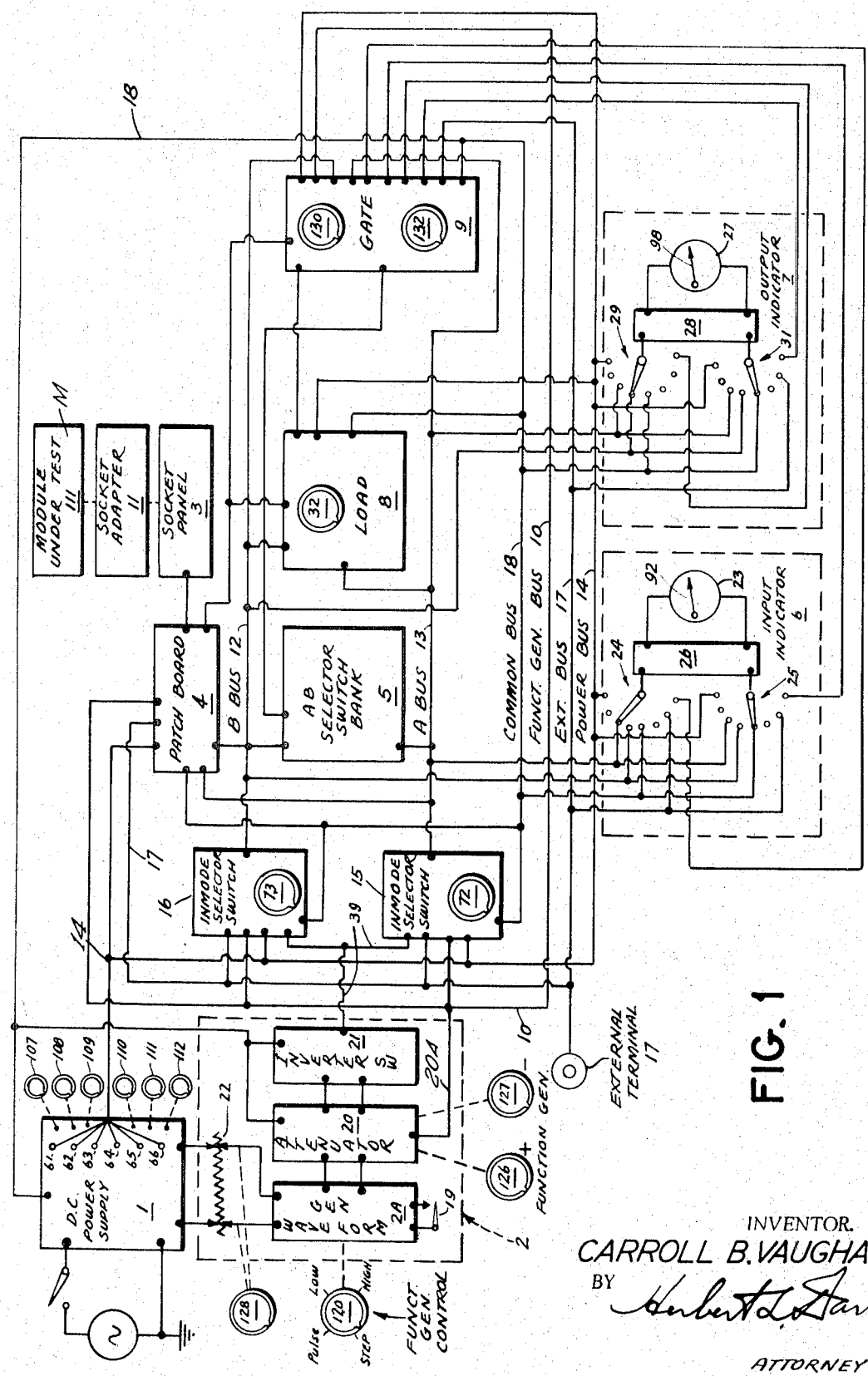

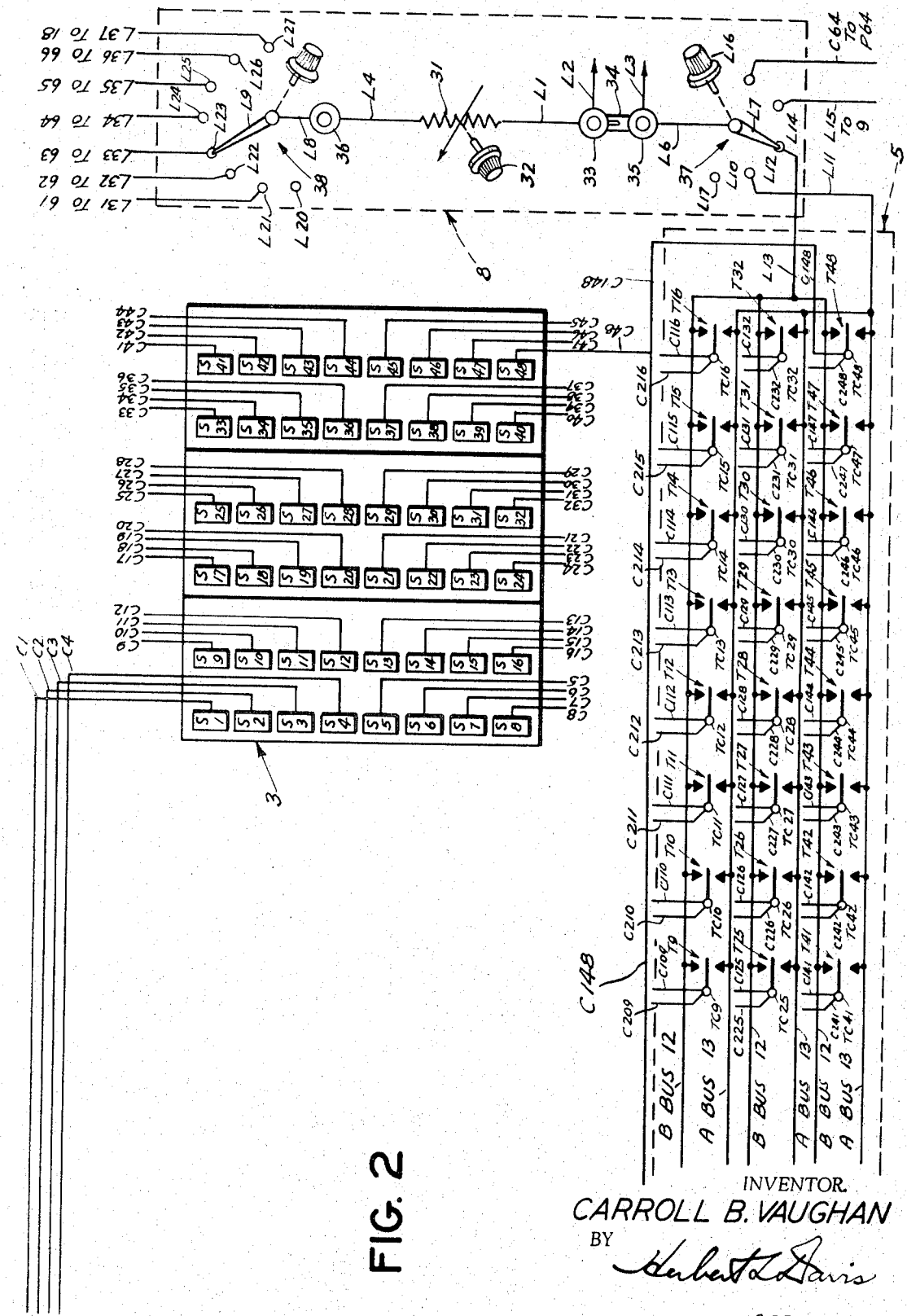

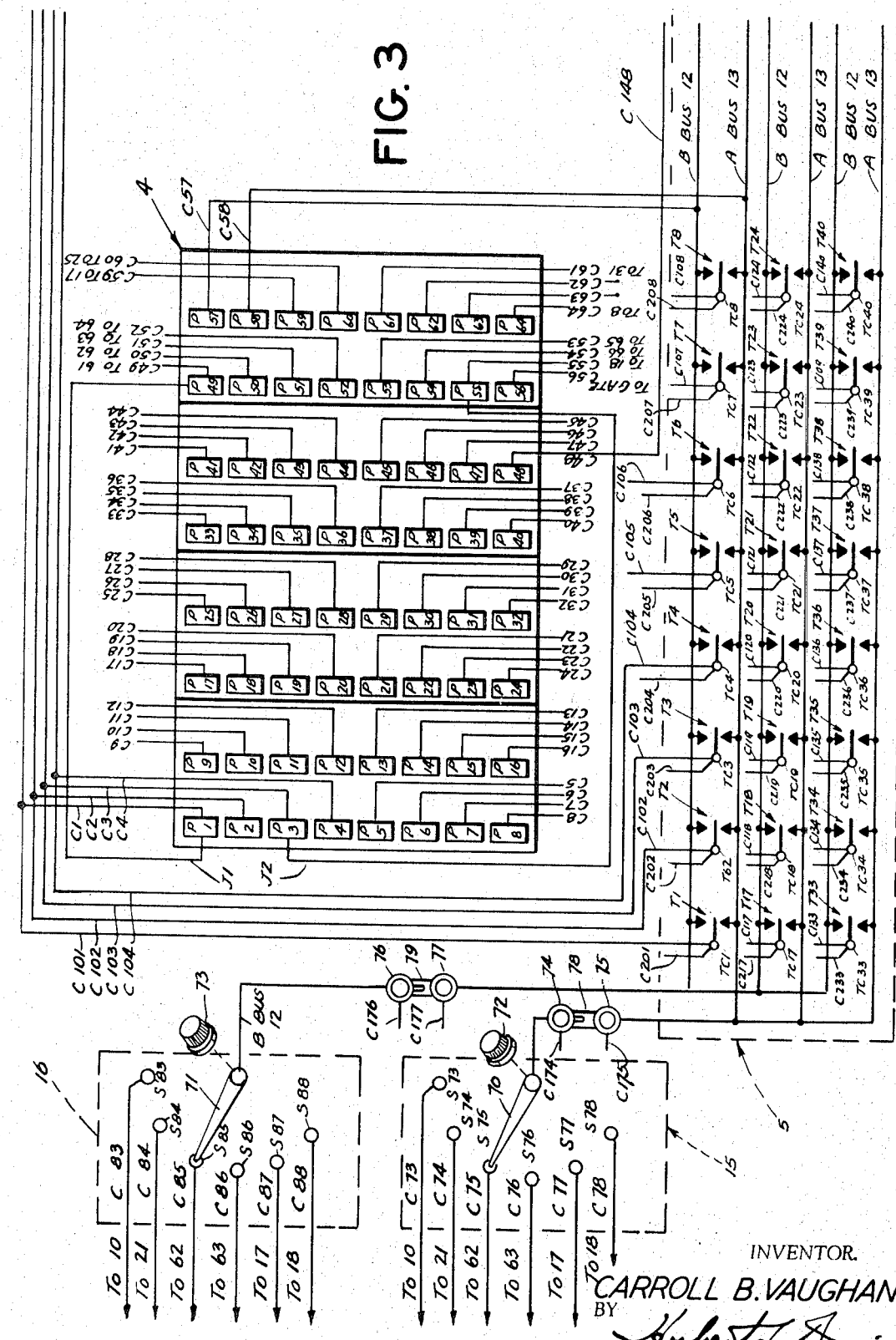

INVENTOR.
CARROLL B. VAUGHAN
BY
ATTORNEY

INVENTOR.
CARROLL B. VAUGHAN
BY
ATTORNEY

INVENTOR.
CARROLL B. VAUGHAN
BY
ATTORNEY

INVENTOR.
CARROLL B. VAUGHAN
BY
ATTORNEY

United States Patent Office 3,549,996
Patented Dec. 22, 1970

3,549,996
UNIVERSAL TESTER FOR DYNAMIC AND STATIC TESTS ON THE OPERATING EFFICIENCY OF ELECTRICAL APPARATUS
Carroll Byrd Vaughan, East Orange, N.J., assignor to The Bendix Corporation, a corporation of Delaware
Continuation of application Ser. No. 166,316, Jan. 15, 1962. This application Apr. 4, 1967, Ser. No. 642,983
Int. Cl. G01r *15/12*
U.S. Cl. 324—73
13 Claims

ABSTRACT OF THE DISCLOSURE

A universal tester having extreme adaptability for providing dynamic and static tests on the operating efficiency of electrical apparatus such as electronic modules having a multiplicity of terminals and including means for generating a plurality of adjustable electrical excitations; a plurality of indicators selectively connectable to appropriate electrical contacts each measuring an electrical quantity such as D.C. or average voltage or current in relation to a corresponding terminal, one of said indicators being appropriate to the input of the tested apparatus and another to the output thereof, and a plurality of switches for selective connection between the indicators, the electrical contacts and the electrical excitations, said plurality of switches including first switching means for selectively applying the several excitations to input terminals of the apparatus under test, second and third switching means for respectively and selectively connecting said one indicator so as to monitor the excitation applied to the input terminals of the tested apparatus, and said other indicator so as to monitor the electrical energy at the output terminals of the apparatus.

CROSS REFERENCE TO RELATED APPLICATIONS

The present application is a continuation of a U.S. application Ser. No. 166,316, filed Jan. 15, 1962, by Carroll Byrd Vaughan and assigned to The Bendix Corporation, in which there is disclosed means for generating a plurality of adjustable electrical excitations and which generating means may be of a conventional adjustable operator-operative type or of a type such as disclosed and claimed in U.S. Pat. No. 3,254,291, granted May 31, 1966 on an application Ser. No. 166,224, filed Jan. 15, 1962 by Carroll Byrd Vaughan; U.S. Pat. No. 3,247,445, granted Apr. 19, 1966 and U.S. Pat. No. 3,263,195, granted July 26, 1966 on applications filed by said Carroll Byrd Vaughan as divisional applications of the aforesaid U.S. application Ser. No. 166,224, all of said patents being assigned to The Bendix Corporation.

The present invention relates to a test set for electrical apparatus such as pluggable computer modules, printed circuits and other such digital electronic subassemblies.

BACKGROUND-PRIOR ART

Heretofore there has been disclosed in a U.S. Pat. No. 3,034,051 granted May 8, 1962, to Steven P. Higgins, Jr. a program switching apparatus for automatically applying a sequence of tests to a device under test, and more specifically there has been provided therein a test signal source for providing a plurality of test signals to be sequentially applied to selected ones of a plurality of test signal lines through the intermediary of a program control crossbar switch and through a card reader to an apparatus under test in accordance with information stored in a storage member or tape, together with a second card reader to distribute output signals from the apparatus to first and second groups of signal monitors, each group of signal monitors including a plurality of signal monitors with an individual signal monitor being operatively connected in each signal output line.

Further, a Loesch U.S. Pat. No. 2,982,916 shows a test circuit for displaying by means of a cathode ray oscilloscope selected characteristic curves of a device under test, while a Davidson U.S. Pat. No. 2,850,699 shows various monitoring circuits in combination with a device under test for enabling the determination of its current gain characteristic.

A Weston U.S. Pat. No. 600,981 merely shows a meter arrangement for simultaneously metering a plurality of electrical quantities, wherein a single housing encloses two independently actuable metering instruments which instruments are so arranged relative to each other that their respective pointers and scales are in substantial alignment, for the purpose of enabling instantaneous comparative reading on the scales associated with each of the pointers, while a Jones U.S. Pat. No. 625,843 shows a metering instrument actuable in accordance with temperative variation, together with an alarm circuit operable in response to the position of a metering instrument pointer having upper and lower threshold limits determined by the selected placement of manually positionable contact clips.

The test sets of the prior art Higgins, Loesch and Davidson patents by the built-in logic or programs of operation thereof have a relatively limited range of test operations that may be effected by the test operator. In distinction in the test set of the present invention by the wide range of operator-operative adjustable electrical excitations that may be effected by the power supply and floating function generator, the provision of a single pair of electrical indicators together with operator-operative means to render the indicators selectively effective to each measure an electrical quantity such as direct current, or average voltage or current in relation to a corresponding electrical terminal, the wide selective application of such excitations that may be effected to a vast multitude of input terminals of an apparatus under test by the operator control of a first switching means, and by the further operator-operative control of second and third switching means through which one of the indicators of the single pair of indicators may be selectively connected so as to monitor the excitation applied to any one of a vast multitude of input terminals of the tested apparatus while the other of said single pair of indicators may be selectively connected so as to monitor the electrical energy at any one of a vast multitude of output terminals of the tested apparatus, there is provided a universal module tester and a powerful tool that may be applied with wide flexibility and extreme adaptability to an apparatus on test. Under the control of an imaginative and skillful operator a vast wealth of information may be obtained about the operating efficiency of the apparatus under test which need not be limited by a predetermined rigid program of tests, but instead in the present invention the tests may be applied to meet the particular requirements of the device under test as the tests proceed and as determined therefrom by the operator.

SUMMARY OF INVENTION

This invention contemplates the provision of a universal tester for effecting dynamic and static tests on the operating efficiency of electrical apparatus such as electronic modules having a multiplicity of terminals comprising: means for establishing separate electrical contacts with each of said terminals; means for generating a plurality of adjustable electrical excitations; a plurality of indicators selectively connectable to appropriate electrical contacts each measuring an electrical quantity such as D.C. or average voltage or current in relation to a corresponding terminal, one of said indicators being appropriate to the input of the tested apparatus and another to the output thereof, and a plurality of switches for selective connection between the indicators, the electrical contacts and the electrical excitations, said plurality of switches including namely first switching means for selectively applying the several excitations to input terminals of the apparatus under test, second and third switching means for respectively and selectively connecting said one indicator so as to monitor the excitation applied to the input terminals of the tested apparatus, and said other indicator so as to monitor the electrical energy at the output terminals of the apparatus.

Another object of the invention is to provide a novel universal tester adapted to test different types of modules, such as modules that can amplify pulses, change levels, invert, reshape, stretch, delay, gate, count, coincide, hold, store, block, indicate, and pass electrical energy.

These and other objects and features of the invention are pointed out in the following description in terms of the embodiment thereof which are shown in the accompanying drawings. It is to be understood, however that the drawings are for the purpose of illustration only and are not a definition of the limits of the invention, reference being had to the appended claims for this purpose.

DESCRIPTION OF THE DRAWINGS

In the several drawings in which corresponding numerals indicate corresponding parts:

FIG. 1 shows a block diagram of a universal module tester embodying the subject matter of the invention.

FIG. 2 is a schematic drawing showing in detail the socket panel, load and part of the switch bank of FIG. 1.

FIG. 3 is a schematic drawing showing in detail a patchboard, selector switches, and part of the selector bank of FIG. 1. FIGS. 2 and 3 are drawn to the same scale and may be placed together side by side to show the interrelation between the parts shown thereon.

FIG. 4 is a detailed drawing of a socket adapter for use with the universal module tester of the present invention.

FIG. 5 is a cutaway perspective drawing of a single socket of the type used in the socket panel of FIG. 2.

FIG. 6 is a detailed view of a jumper for use on the patchboard of FIG. 3.

DESCRIPTION OF THE INVENTION

Figure 7:
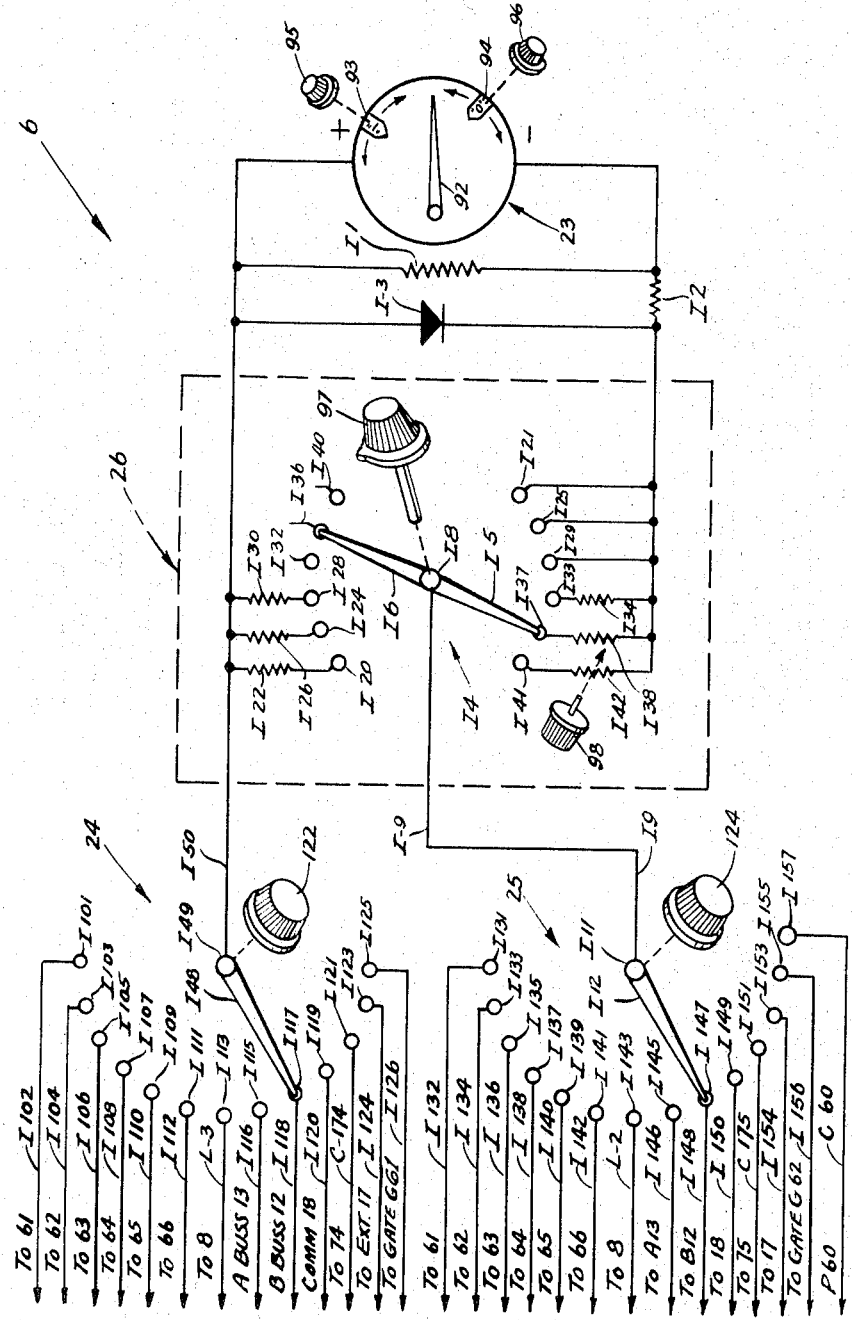
FIG. 7 is a detailed schematic view of the input indicator of the subject invention.

Referring to the drawing of FIG. 1, there is shown therein a block diagram of the universal tester for electronic modules. The tester is comprised generally of a power supply 1, a function generator 2, a socket panel 3, a patchboard 4, an A–B selector switch bank 5, an input indicator 6, an output indicator 7, a load 8, and a gate 9.

A module M to be tested is plugged into the test set and connector terminals or pins of the module are connected by appropriate switching and patching to sources of electrical excitation and to various loads. The module under test will then be subject to the same electrical environment in the test set as that to which it would normally be subject in a computer or other system in which it may be designed to function as an operating part. Signals are fed into the module, and both the input and output signals are monitored on the input and output indicators 6 and 7. By appropriate programing and monitoring of the input and output signals, each different module may be tested over the entire range of its capabilities.

The module M to be tested is plugged into a socket adapter 11 which in turn fits into the socket panel 3. The socket adapter 11 permits any type of module regardless of its socket shape and number of pins to be connected into the universal module tester. A typical socket adapter is shown in FIG. 4 where, for example, one end of the socket head 42 is capable of receiving the terminals of a module having up to 16 terminals arranged in two rows of 8 terminals each as is usual in one type of commercially available printed circuit card. The other end 41 of the socket adapter 11 is provided with an array of mating pins which are shown, for example, comprising 48 spade pins having 6 parallel columns of 8 pins, each of said pins are pluggable into the socket panel 3. The central portion 43 of the socket adapter contains, in this example, 16 electrical conductors, one each leading from each of the connected terminals at the socket head 42 to the corresponding first 16 pins in the array 41 at the other end of the adapter.

It is to be noted that there will be a different socket adapter 11 having a different socket head (or mating connector) 42 for each group of modules that has a different arrangement of connector terminals. An individual socket adapter may have one socket head (42 as shown in FIG. 4) or may have several different socket heads on a single adapter body, with a different socket head for a different type of module. The multiple socket heads are wired in parallel to the terminals on the socket array 41.

The terminals in the array 41 on the adapter 11 are arranged so as to plug into the socket panel 3 which, for example, is of a type having 6 parallel columns of 8 sockets each.

For a module having a pin terminal arrangement which corresponds to the pin arrangement of the socket panel 3, the socket adapter 11 may be dispensed with, and the module may be plugged directly into the socket panel 3.

The choice of the socket array 41, and the socket panel 3, with 48 pins of the configuration described is for the purpose of example only, it being understood that printed circuit array 41 and the socket panel 3 can be of any size and configuration and use pins of any type.

SOCKET PANEL AND PATCHBOARD ASSEMBLY

The socket panel 3 includes a plurality of individual terminals or sockets which are shown in detail in an electrical schematic drawing in FIG. 2 bearing the legends, S–1 through S–48. In this FIG. 2, the socket panel 3 includes 48 sockets in a particular configuration so as to agree in quantity, style, and relative location with the type and arrangement of the pins in the array 41 in the socket adapter 11. As noted before, the invention can be built to accommodate modules of any size, and thus the number 48 is not essential to the invention.

A detail of a single socket S, on the socket panel 3, is shown in a cutaway perspective drawing of FIG. 5 and comprises an electrical conducting body 50, having a terminal 52 at one end soldered, or otherwise electrically connected, with an electrical conductor 53. At the other end of the conducting body 50 there is a fork shaped pin 54 of a type that will fit and make electrical contact with a similar fork shaped pin 55 when the two pins are at right angles to each other. Pin 55, for example, may be a pin in the array 41 of the socket adapter 11. The central portion in the conducting body 50 is encased in Bakelite or other suitable insulating material 56 and is held mechanically fixed therein by the presence of the Bakelite about an indentation 57 in the conducting body 50. The pin 54 of the socket is shown as a hemophrodite type, however, any other suitable type of pin may be used, but of course, the mating pin 55 must be of a type capable of making contact with the pin 54.

The patchboard 4 is similar in structure to the socket panel 3 and includes a plurality of individual sockets, 64 of which are shown schematically in FIG. 3 bearing the legends P–1 through P–64 and which sockets may be of the type used in the socket panel 3 and shown in detail in FIG. 5, each having a terminal end and a pin end. As noted above, any suitable type of socket may be used, the only requirement being that each socket be capable of at least two electrical connections, and proper mating with corresponding pins cooperating therewith.

The terminals of each socket P–1 through P–48, as shown in FIG. 3, are connected by electrical conductors C–1 through C–48 to the corresponding terminals of sockets S–1 through S–48 on the socket panel 3 as shown in FIG. 2. Each of the conductors C–1 through C–48 are wired by conductors C–101 through C–148 as shown in FIGS. 2 and 3 to corresponding arms TC–1 through TC–48 as shown in FIGS. 2 and 3, of 48 toggle switches T–1 through T–48 on the A–B selector switch bank 5, shown in FIG. 1.

The terminals of sockets P–49 through P–54 on the patchboard 4 of FIG. 3 are connected one each to a different adjustable output of the D.C. power supply 1 of FIG. 1. In particular, the terminal of socket P–49 is connected by a conductor C–49 to an adjustable voltage output terminal 61 of the power supply 1, the terminal of socket P–50 is connected by conductor C–50 to an adjustable voltage output terminal 62 of the power supply 1, the terminal of socket P–51 is connected by conductor C–51 to an adjustable voltage output terminal 63 of the power supply 1, the terminal of socket P–52 is connected by conductor C–52 to an adjustable voltage output terminal 64 of the power supply 1, the terminal of socket P–53 is connected by conductor C–53 to an adjustable voltage output terminal 65 of the power supply 1, and the terminal of socket P–54 is connected by conductor C–54 to an adjustable voltage output terminal 66 of the power supply 1.

The remaining sockets P–55 through P–64 on the patchboard 4, as shown schematically in FIG. 3, are connected to other switching points, reference points, and sources of excitation located in the universal module tester. In particular, the terminal of socket P–55 is connected by a conductor C–55 to a common potential bus 18. The terminal socket P–56 is connected by conductor C–56 to the gate 9. The terminal of socket P–57 is connected by conductor C–57 to a B bus 12. The terminal of socket P–58 is connected by conductor C–58 to an A bus 13. The terminal of the socket P–59 is connected by conductor C–59 to an external terminal post 17. The terminal of socket P–60 is connected by conductor C–60 to a negative side of the input indicator 6 shown in detail in FIG. 7. The terminal of socket P–61 is connected by conductor C–61 to a negative side of the output indicator 7 shown in detail in FIG. 8. The terminal of the socket P–62 is connected to conductor C–62 which is left open for future expansion. The terminal of socket P–63 is connected to conductor C–63 which is left open for future expansion. The terminal of socket P–64 is connected by conductor C–64 to a contact of the load 8, as shown by FIG. 2.

The socket panel 3, as shown by FIG. 2, and the patchboard 4, as shown by FIG. 3, are so electrically interconnected by conductors C–1 through C–48 that when the module to be tested, M, the socket adapter 11, and the socket panel 3 are properly plugged together, a first (or No. 1) terminal or pin of the module under test is plugged into a corresponding first (or No. 1) socket on the socket head 42 and thus the No. 1 terminal of the module is connected by a conductor in the socket adapter body 43 to the first pin on the socket adapter array 41 which is plugged into the first socket of the socket panel 3, i.e. socket S–1 of FIG. 2. The terminal of socket S–1 is wired by conductor C–1 to the terminal of socket P–1 on the patchboard 4 of FIG. 3. A second (or No. 2) pin of the module under test plugs into a corresponding second (or No. 2) socket in the head 42 of the adapter 40 and is connected by a conductor in the socket adapter body 43 to the second (or No. 2) pin on the socket adapter array 41 which pin is plugged into the socket of the socket S–2 on the socket panel 3 of FIG. 2, the terminal of socket S–2 is wired by conductor C–2 to the terminal of socket P–2 on the patchboard 4 of FIG. 3, and likewise, for all of the terminals of the module under test. Thus, each of the pins of module under test is connected in an orderly fashion to a corresponding socket P–1 to P–48 at the patchboard 4.

At the patchboard 4 of FIG. 3, two pins of the module under test may be connected together by a jumper from any one of the pins of the sockets P–1 through P–48 to another one of the pins of the socket P–1 through P–48. The jumper may be of the type shown in FIG. 6 comprising an electrical conductor 58 terminated at opposite ends by a spade pin 59 and a spade pin 60; and which spade pin is of the type shown in FIG. 5 and therein bearing the legend 55, and capable of engaging the pins of the socket on the patchboard 4.

Likewise, two pins of the module under test may be connected together through a resistor, capacitor, inductor, or other two terminal element or subassembly by the inclusion of such resistor, capacitor, inductor, two terminal element, or subassembly serially with the conductor 58 of the jumper.

In similar fashion, patching may also be performed on the patchboard between more than two sockets. For direct connection between more than two sockets, three or more conductors are joined together at one of their ends and the other ends are terminated each in a pin of the type shown in FIG. 5. The pins are plugged into the appropriate sockets P on the patchboard 4. Likewise, elements or subassemblies having more than two terminals are connected between sockets on the patchboard 4. This is accomplished by having each terminal of the multiterminal element connected to a conductor which is terminated in a pin of the type shown in FIG. 5 bearing the legend 55, which pin is in turn plugged into the appropriate socket P on the patchboard 4.

At the patchboard 4, the pins of the module under test are connected as appropriate to the power supply 1. Jumpers 58 such as shown in FIG. 6 may be used to connect any one of the pins of the sockets P–1 through P–48 to any one of the pins of the sockets P–49 through P–54 which are connected to the adjustable power supply 1. One such connection is shown schematically by the jumper J–1 in FIG. 3 between pin P–1 and P–49. Should a particular module require more than one D.C. potential, two or more jumpers may be used to connect the appropriate pins P–1 through P–48 (which are connected to corresponding pins on the module under test) to the different potentials of the power supply 1 which are available at sockets P–49 through P–54 on the patchboard 4.

The module under test is connected to common by placing a jumper (which may be of the type described above and shown in FIG. 6), between the pin of the socket P–55 (which is connected to the common potential bus 18 by the conductor C–55) and the pin of the socket on the patchboard 4 which is connected to the pin of the module M and which is to be connected to the common potential. One such connection is shown schematically in FIG. 3 between pin P–55 and P–3 and bears the legend J–2.

In similar manner, the pins of the module under test are connectable by jumpers on the patchboard 4 to the other switching and reference points that are available at pins P–56 through P–64 or the patchboard 4.

A–B SELECTOR SWITCH BANK

Each toggle switch T–1 through T–48 in the A–B selector switch bank 5 has a pole TC–1 through TC–48 which may be placed in any one of three operative positions, two of which are connective positions. In particular, there is a center position which is open; an "up" position which makes contact to the out bus or the B bus 12; and a "down" position which makes contact to an in bus or A bus 13.

VARIABLE LOAD

Figure 8:
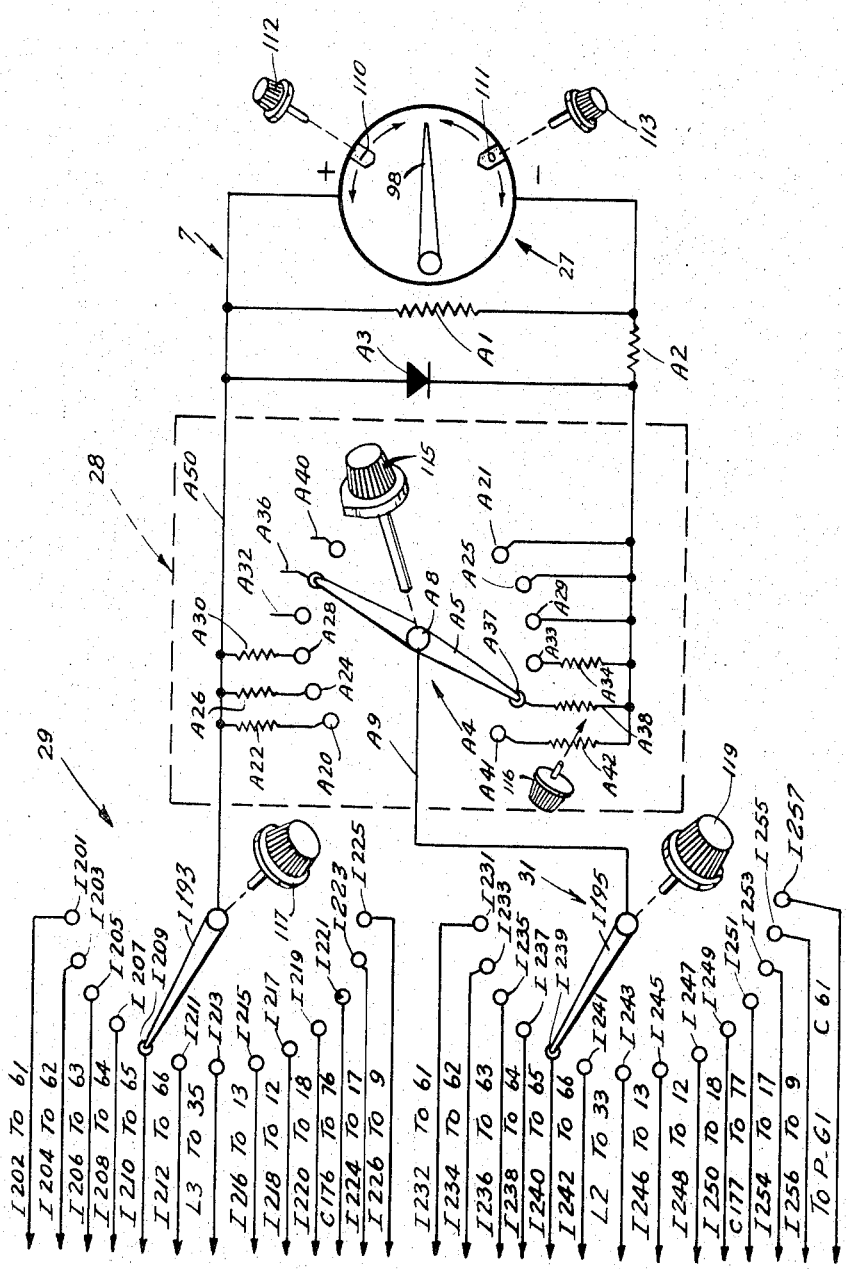
FIG. 8 is a detailed schematic drawing of the output indicator of the subject invention.

The A bus 13 and the B bus 12 are connectable to load 8 which is shown in FIG. 1 as a box bearing legend LOAD and in detail in FIG. 2. Referring to the detailed schematic drawing of FIG. 2, the load comprises a resistor 31 of the variable type operable by a manually adjustable knob 32 and having a maximum value, for example, of 10,000 ohms. One end of the variable resistor 31 is connected by a conductor L–1 to a terminal post 33 which is connected by a removable shorting strap 34 to a second terminal post 35. Terminal post 33 is connected by conductor L–2 to the negative side of the indicators 6 and 7, as shown in FIGS. 7 and 8, and terminal post 35 is connected by conductor L–3 to the positive side of the indicators 6 and 7 as shown in FIGS. 7 and 8. Thus, when the shorting strap 34 is removed and the indicator 6 or 7 is connectable between the terminal posts 35 and 33, the indicator measures the current flowing through the resistor 31.

The other side of the variable resistor 31 is connected by a conductor L–4 to a terminal post 36. Terminal post 36, in conjunction with terminal post 33 or 35, affords connections at which external measuring devices such as an oscilloscope or meter may be connected to measure or display the voltage across the load resistor 31. Also, terminal post 36, in conjunction with terminal post 33 or 35, affords readily accessible terminals for adding external loads.

The resistive load 31 is connectable from either the A bus 13, the B bus 12, the gate 9, or socket P–64 on the patchboard 4, to any of the D.C. power supplies 61 through 66, or to the common potential available on bus 18. The connections are made by two rotary switches 37 and 38. In particular, terminal post 35 is connected by conductor L–6 to the selector L–7 of an in-load rotary switch 37. The load rotary switch 37 has four selectively closed switch terminals L–10, L–12, L–14, and L–16 and an open switch terminal L–17. The switch terminal L–10 is connected by a conductor L–11 to the A bus 13. The switch terminal L–12 is connected by a conductor L–13 to the B bus 12. The switch terminal L–14 is connected by a conductor L–15 to the gate 9. The switch terminal L–16 is connected by a conductor C–64 to socket P–64 on the patchboard 4.

The other side of the load resistor 31 is connected through a conductor L–4 to the terminal post 36 and by a conductor L–8 from the post 36 to the selector arm L–9 of the out-load rotary switch 38. Rotary switch 38 selectively connects one side of the resistor 31 to an open switch terminal L–20 or to one of the switch terminals L–21 through L–27 on the rotary switch 38 which terminals L–21 through L–27 are respectively connected by conductors L–31 through L–37 to electrical potentials available at the power supply 1 and the common potential available on common bus 18.

In particular, termnial L–21 is connected by conductor L–31 to terminal 61 on the power supply 1. Terminal L–22 is connected by conductor L–32 to terminal 62 on the power supply 1. Terminal L–23 is connected by conductor L–33 to terminal 63 on the power supply 1. Terminal L–24 is connected by conductor L–34 to terminal 64 on the power supply 1. Terminal L–25 is connected by conductor L–35 to terminal 65 on the power supply 1. Terminal L–26 is connected by conductor L–36 to terminal 66 on the power supply 1. Terminal L–27 is connected by conductor L–37 to the common bus 18.

One of the functions of the load 8 is to terminate a pin of the module under test in the resistor 31 of the load 8 through the selective operation of the toggle switches T in the A–B switch bank 5, and the selector switches 37 and 38. It should be noted that additional loads can be connected to the module by patching at the patchboard 4. Alternatively, the load resistor 31 may be connected by patching the pin P–64 and selective operation of selector switches 37 and 38.

A AND B BUS TERMINAL POST

Both the A bus 13 and the B bus 12, as shown in the schematic drawing of FIG. 3, have serially connected therein a pair of terminal posts 74 and 75, and 76 and 77, respectively, shorted together by a shorting strap 78 and 79, respectively. Each terminal post is connected to either the input or output indicator 6 and 7 so that upon the removal of the shorting strap, the indicators may measure the current flowing in either the A bus 13 and/or the B bus 12.

In particular, terminal post 74 is connected by a conductor C–174 to the positive side of the input indicator 6 through a selectively operable switch mechanism 24, as shown in FIG. 7, and terminal post 75 is connected by conductor C–175 to the negative side of the input indicator 6 through a selectively operable switch mechanism 25, as shown in FIG. 7. Terminal post 76 is connected by conductor C–176 to the positive side of the output indicator 7 through a selectively operable switch mechanism 29, as shown in FIG. 8, and terminal 77 is connected by conductor C–177 to the negative side of the output indicator 7 through a selectively operable switch mechanism 31, as shown in FIG. 8. A polarity reversal switch (not shown) may be connected in each pair of conductors (viz: conductor C–174 and C–175 constituting one pair, and conductor C–176 and C–177 constituting the other pair) so that the current being measured by the input and output indicators 6 and 7 is always of such a polarity as to agree with the proper operation of these indicators.

INMODE SELECTOR SWITCHES

The A bus 13, as shown in the schematic drawing of FIG. 3, is connected to a selector arm 70 of a first inmode rotary-selector switch 15, and the B bus 12 is connected to the selector arm 71 of a second inmode rotary-selector switch 16. Each selector arm 70 and 71 is positionable by an operator-operative knob 72 and 73 respectively to operatively connect the A and B busses, 13 and 12, respectively, to selector switch terminals S–73, S–74, S–75, S–76, S–77, and S–78 on switch 15, and S–83, S–84, S–85, S–86, S–87, and S–88 on switch 16. These terminals (S–73 through S–78 and S–83 through S–88) are connected by conductors (C–73 through C–78 and C–83 through C–88) to terminals on the power supply 1, to the outputs of function generator 2, to the external terminal post 17, and to the common bus 18. In particular, terminal S–73 of inmode selector switch 15 and terminal S–83 of inmode selector switch 16 are connected respectively by conductors C–73 and C–83 to the output of the function generator 2 available on the function generator bus 10. Terminal S–74 of the inmode selector switch 15 and terminal S–84 of the inmode selector switch 16 are connected respectively by conductors C–74 and C–84 to an output line 39 leading from an inverter 21 of the function generator 2.

Terminal S–75 of the inmode selector switch 15 and terminal S–85 of the inmode selector switch 16 are connected by conductors C–75 and C–85 respectively to terminal 62 which is an output of power supply 1. Terminal S–76 of the inmode selector switch 15 and terminal S–86 of the inmode selector switch 16 are connected respectively by conductors C–76 and C–86 to the terminal 63 of the power supply 1. Terminal 77 of the inmode selector switch 15 and terminal 87 of the selector switch 16 are connected respectively by conductors C–77 and C–87 to the external bus 17 leading to terminal 17. Terminal S–78 of the inmode selector switch 15 and terminal S–88 of the inmode selector switch 16 are connected respectively by conductors C–78 and C–88 to common potential available on the common bus 18.

SOURCE OF EXCITATION

The source of excitation comprises two different units: an adjustable positive and negative D.C. power supply 1, and a floating function generator 2. The D.C. power supply 1 provides six continuously variable positive and negative D.C. potentials. The six outputs are available at six terminals 61, 62, 63, 64, 65, and 66 and are shown schematically in the block diagram of FIG. 1 as being available on a single power supply bus 14 including leads from each of the six terminals. The power supply 1 may be of a conventional type.

The function generator 2 produces four basic voltage functions, (1) a step of voltage, (2) a pulse of voltage triggered by a no-bounce contact switch 19, (3) a low frequency, approximately one cycle per second, square wave, and (4) a higher frequency square wave, for example, 200 kilocycles. Alternatively, the low frequency and the high frequency square waves can be replaced by a single continually frequency adjustable square wave and/or a continually frequency adjustable square wave of adjustable duty cycle.

These voltage functions may be amplitude adjusted by an amplitude adjuster or attenuator 20 from both positive to negative direction and also from the negative to positive direction. The two adjustments are made by two operator-operative knobs 126 and 127.

The output of the function generator is floating, and the entire function generator 2 is adjustably biased across power supply through a variable resistor 22. The floating level is adjustable by an operator-operative knob 128.

The voltage functions are generated by a wave form generator 2A which may be of any conventional or convenient type. An operator-operative knob 120 is connected to the wave form generator to select the desired voltage function. The step voltage function and the single pulse function are obtained in conjunction with the no-bounce contact switch 19 as follows: the operator operates the operator-operative knob 120 to the voltage step position, and then operates the no-bounce contact switch 19 which produces the step of voltage. Upon release of the no-bounce switch 19, the step of voltage is withdrawn. Likewise, for a pulse of voltage, the operator operates the operator-operative knob 120 to the pulse position and then operates the no-bounce contact switch 19 to produce a single pulse. To produce subsequent pulses, the operator must operate the no-bounce contact switch 19.

The output of the wave form generator 2A is fed through the attenuator 20 which may be of conventional type and then to a function generator bus 10, which connects to various switching terminals and points in the universal module tester.

A second output from the attenuator 20 is fed into an inverter 21 which may be of conventional type and which produces an inverted function (which may have an independently adjustable D.C. level (not shown)).

Thus, there are two outputs of the function generator 2. The first is the function generated by the generator 2A applied through the attenuator 20 and made available on the function generator bus 10 through output line 20A; a second output is the function inverted and is available at the output line 39 leading from the inverter 21.

The function generator 2 may be of any convenient or conventional type.

The basic operation in the universal module tester calls for a wide variety of signals to be applied to the input pins of the module under test M by the respective sources of excitation 1 and 2 or by external source connected through terminal 17. The input signal is monitored on the input indicator 6. At the same time, the output signal from the module is monitored on the output indicator 7. By a comparison of the dynamic changes in the input and output indicators for a variety of inputs, it is possible to determine whether or not the module is functioning properly.

After describing the two indicators 6 and 7, and the gate circuit 9, several examples will be given illustrating the relations between the structures and how the universal module tester gives dynamic indication of the operation or failure of the module.

INPUT INDICATOR

The input indicator 6 is shown in detail in a schematic drawing in FIG. 7 and is a multi test instrument that can be selectively connected in series with, or across, various points on the universal module tester. In particular, the input indicator 6 comprises a deflectional meter movement 23 which, for example, may be a 50 microampere direct current ammeter having a positive and negative side as indicated by the legends + and − on the movement 23 of FIG. 7. The meter 23 is connected in a bank 26 of shunting and series resistor and diodes so that the combination of the meter 23 and bank 26 may operate as a multi test instrument capable of accurate measurements of the direct and average level of pulse, square and semiquare voltages and currents. The meter 23 and bank 26 are selectively connected through the operation of two rotary switches 24 and 25 to various points of electrical potential in the tester.

The meter 23 has on its face an indicator needle 92, and two marker flag indicators 93 and 94 manually positionable by conventional means operable by operator-operative knobs 95 and 96. The manually positionable marker flags 93 and 94 may be of any convenient or conventional type. The two flags 93 and 94 are positioned arcuately about the perimeter of the meter face by operation of the knobs 95 and 96 so as to reference the logic "zero" and logic "one" levels, when a module that uses binary numbers is being tested.

The bank 26 of shunting and series resistors and diodes is shown, for example, as providing full scale deflection of the needle 92 for a current of 48 milliamperes, 12 milliamperes, and 1.2 milliamperes; and for 48 volts and 12 volts. There is also an adjustable voltage range, having an adjustable full scale voltage deflection of 10 to 50 volts.

In particular, the bank 26 comprises a critical damping resistor I–1 which, in this example, is 10,000 ohms resistive type connected in parallel with the meter 23 to damp any overshoot of the needle 92. A diode I–3 shunts the series parallel combination of resistor I–1, and the meter 23 and is forward biased with the anode on the positive side of meter movement 23 and the cathode on the negative side of the meter 23. The diode protects the meter movement 23 from overloads by shunting any currents greater than the full scale of the input for the D.C. meter movement 23. A series resistor I–2, in this example of 5,600 ohms resistive type, is connected in series with the parallel combination of the resistor I–1 and movement 23 to prevent the diode from interfering with less than full scale operation of the meter.

A group of resistors I–22, I–26, I–30, I–34, I–38 and I–42 are selectively connectable in series or in parallel with the series combination of the meter 23, resistors I–1 and I–2 and diode I–3 by operation of a rotary switch I–4. Switch I–4 has two selector arms I–5 and I–6 mechanically connected together back to back and electrically connected together at juncture I–8. The selector arms I–5 and I–6 are mechanically positioned by an operator-operative knob 97. An electrical conductor I–9 connects the electrical juncture I–8 of the two arms I–5 and I-6 to a fixed terminal I-11 of the selector arm I-12 of rotary switch 25.

Operation of the ganged rotary switch I-4 selectively converts the meter 23 into an ammeter or a volt meter with full scale ranges as indicated above. Thus, when the selector arms I-5 and I-6 of the range switch I-4 make contact with terminals I-20 and I-21, a resistor I-22, which, for example, is 260 ohms, is connected in parallel with the meter 23, resistors I-1 and I-2 and diode I-3 so that the meter 23 operates as a 1.2 milliampere ammeter. Similarly, when the selector arms I-5 and I-6 of rotary switch I-4 make contact with terminals I-24 and I-25, resistor I-26 of, for example, 12.6 ohm resistance, is connected in parallel across the meter 23, resistors I-1 and I-2 and diode I-3 so that the meter 23 operates as an ammeter with a full scale deflection of 12 mildiamperes. When the selector arms I-5 and I-6 of the rotary switch I-4 make contact with terminals I-28 and I-29, a resistor I-30, of, for example, 6.2 ohm resistance is connected in parallel with the meter 23, shunt resistor I-1, series resistor I-2, and diode I-3 thus effectively causing the meter 23 to operate as an ammeter with a full scale deflection of 48 milliamperes. When the selector arms I-5 and I-6 of the rotary switch I-4 make contact with terminals I-32 and I-33 and effectively connects the meter 23, shunt resistor I-1, series resistor I-2 and diode I-3 in series with a resistor I-34 of, for example, 234,000 ohm resistance, so that the meter 23 may then operate as a voltmeter with a full scale deflection of 12 volts. When selector arms I-5 and I-6 of the rotary switch I-4 makes contact to the terminals I-36 and I-37, a series resistor I-38, of, for example, 930,000 ohms, is connected in series with the series parallel combination of resistor I-1 and I-2 and diode I-3 and meter movement 23, so that the meter 23 operates as a volt meter with a full scale deflection of, for example, 48 volts.

When selector arms I-5 and I-6 of the rotary switch I-4 makes contact to the terminals I-40 and I-41, an adjustable series resistor I-42, which has a range of, for example, 190,000 to 990,000 ohms connected in series with the series parallel combination of resistor I-1 and I-2, diode I-3, and meter movement 23, so that the meter 23 operates as a volt meter with an adjustable full scale deflection of 10 to 50 volts.

The adjustment of the variable resistor I-41 is manually controlled by an operator-operative knob 98.

The meter 23 and bank 26, which constitute a multi test instrument, are connected by rotary switches 24 and 25 to various points throughout the tester. The rotary switch 24 comprises a selector arm I-48 connected at its fixed terminal I-49 by conductor I-50 to the positive side of meter 23. Rotary switch 25 comprises selector arm I-12 connected at its fixed terminal I-11 through a conductor I-9 to the juncture I-8 of the two selector arms I-5 and I-6 of the rotary switch I-4. The rotary switch 24 is the positive input for the indicator 6, and rotary switch 25 is the negative input for the indicator 6, and by operation of the two rotary switches 24 and 25 the meter is connected to various potentials, and is in series or in parallel with various electrical quantities in the uinversal module test.

The selector switch contacts of rotary switches 24 and 25 are connected as follows: on rotary switch 24, switch contact I-101 is connected by conductor I-102 to terminal 61 of power supply 1. Switch contact I-103 is connected by conductor I-104 to terminal 62 of the power supply 1. Switch contact I-105 is connected by conductor I-106 to terminal 63 of the power supply 1. Switch contact I-107 is connected by conductor I-108 to terminal 64 of the power supply 1. Switch contact I-109 is connected by conductor I-110 to terminal 65 of the power supply 1. Switch contact I-111 is connected by conductor I-112 to terminal 66 of the power supply 1. Switch contact I-113 is connected by conductor L-3 to the terminal post 35 on the load 8. Switch contact I-115 is connected by conductor I-116 to the A bus 13. Switch contact I-117 is connected by conductor I-118 to the B bus 12. Switch contact I-119 is connected by conductor I-120 to the common bus 18. Switch contact I-121 is connected by conductor C-174 to the terminal post 74 on the A bus 13. Switch contact I-123 is connected by conductor I-124 to the external terminal or external terminal bus 17. Switch contact I-125 is connected by conductor I-126 to switch contact G-61 on the selector switch 81 of the gate 9.

Likewise, the selector switch contacts on rotary switch 25 are connected to various points throughout the universal module tester as follows. Switch contact I-131 is connected by conductor I-132 to terminal 61 of the power supply 1. Switch contact I-133 is connected by conductor I-134 to terminal 62 of the power supply 1. Switch contact I-135 is connected by conductor I-136 to the terminal 63 of the power supply 1. Switch contact I-137 is connected by conductor I-138 to the terminal 64 of the power supply 1. Switch contact I-139 is connected by conductor I-140 to terminal 65 of the power supply 1. Switch contact I-141 is connected by conductor I-142 to terminal 66 of the power supply 1. Switch contact I-143 is connected by conductor L-2 to the terminal post 33 on the load 8. Switch contact I-145 is connected by conductor I-146 to the A bus 13. Switch contact I-147 is connected by conductor I-148 to the B bus 12. Switch contact I-149 is connected by conductor I-150 to the common bus 18. Switch contact I-151 is connected by conductor C-175 to the terminal post 75 on the A bus 13. Switch contact I-153 is connected by conductor I-54 to the external bus 17. Switch contact I-155 is connected by conductor I-156 to switch contact G-62 on the selector switch 81 of the gate 9. Switch contact I-157 of the switch 25 is connected by the conductor C-60 to the terminal socket P-60 of the patchboard 4.

A prime purpose of the input indicator 6 is to measure and monitor the electrical quantity being applied to the input of the module M under test. Under normal test operations, the input to the module under test is applied through the A bus 13. Thus, the positive side of the meter 23 is connected with the rotary switch 24 and through switch contact I-115 and conductor I-116 to the A bus 13 and the negative side of the meter 23 is connected with the rotary switch 25 and through switch contact I-149 and conductor I-150 to the common bus 18, and with the range switch I-4 set to the appropriate voltage scale. In addition to monitoring the input signal, the universal module tester performs other functions, such as for example, calibration of the voltage sources, self-calibration, current measurement to the load, and it is for these purposes that the operator-operative switches 24 and 25 may make contact to such a wide variety of points on the universal module tester.

OUTPUT INDICATOR

The output indicator 7 is shown in detail in the schematic drawing of FIG. 8 and is similar to the input indicator 6 and comprises a meter movement 27 which, for example, is a 50 microampere direct current type ammeter meter 27 identical to the meter 23 and having an indicator needle 98 and two similar flag indicators 110 and 111, manually positionable by conventional means operable by operator-operative knobs 112 and 113. The meter 27 is selectively connectable through a variety of shunting and series resistors A-1 and A-2 and diode A-3 and a bank 30 of shunting and series resistors in a box bearing legend 28 in which corresponding parts to those heretofore described with reference to the box 26 on the input indicator 6 have been indicated by like numerals bearing the letter A and which parts permit the meter 27 to operates as a multi test instrument as does its counterpart in the input indicator 6 so that meter 27 on full scale will be able to read 12 milliamperes, 1.2 milliamperes, 48 milliamperes, 48 volts, and 12 volts, and adjustable voltage range 10–50 volts. The choice of current or voltage ranges being selectable by an operator-operative knob 115 of a range selector switch having a knob 115, and the adjustment on the variable range meter being made by operation of another operator-operative knob 116.

The positive side of meter 27 and bank 28 is connected to the selector I-193 of a rotary switch 29, and the negative side of the meter 27 and bank 28 is connected to the selector I-195 of a second rotary switch 31.

The prime purpose of the output indicator 7 is to monitor the output signal as it appears on the output bus or B bus 12. However, the indicator 7 is versatile and may be used to measure other quantities. For this purpose, the rotary switch 29 may make contact with any of the output terminals of the power supply 1, the load 8, the A bus 13, the B bus 12, common bus 18, the external bus 17 and the gate 9. These connections may be traced in detail with the aid of a schematic drawing shown in FIG. 8. Referring to the drawing of FIG. 8, each rotary switch 29 and 31 has a center arm I-193 and I-195, respectively, which may selectively make contact with switch contacts located in the respective rotary switches 29 and 31. In particular, switch contacts I-201 and I-231 on rotary switches 29 and 31, respectively, are connected by conductors I-202 and I-232 to terminal 61 of the power supply 1. Switch contacts I-203 on rotary switch 29 and switch contacts I-233 on rotary switch 31 are connected respectively by conductors I-204 and I-234 to terminal 62 on the power supply 1. Switch contacts I-205 on rotary switch 29 and switch contact I-235 on rotary switch 31 are connected respectively by conductors I-206 and I-236 to terminal 63 on the power supply 1. Switch contact I-207 on rotary switch 29 and switch contact I-237 on rotary switch 31 are connected by conductors I-208 and I-238 to terminal 64 on the power supply 1. Switch contact I-209 on the rotary switch 29 and switch contact I-239 on the rotary switch 31 are connected by conductors I-210 and I-240 to terminal 65 on the power supply 1. Switch contact I-211 on rotary switch 29 and switch contact I-241 on rotary switch 31 are connected respectively by conductor I-212 and I-242 to terminal 66 on the power supply 1. Switch contact I-213 on rotary switch 29 and switch contact I-243 on rotary switch 31 are each connected respectively by conductors L-3 and L-2 to terminal post 35 and terminal post 33 of the load 8 as shown in FIG. 2. Switch contact I-215 on rotary switch 29 and switch contact I-245 on rotary switch 31 are connected respectively by conductors I-216 and I-246 to the output of the A bus 13. Switch contact I-217 on rotary switch 29 and switch contact I-247 on rotary switch 31 are connected respectively by conductors I-218 and I-248 to the output of the B bus 12. Switch contact I-219 on the rotary switch 29 and switch contact I-249 on rotary switch 31 are connected respectively by conductors I-220 and I-250 to the common bus 18. Switch contact I-221 on the rotary switch 29 and terminal I-251 on rotary switch 31 are connected to terminal posts 76 and 77 on the B bus 12, respectively, by conductors C-176 and C-177. Switch contact I-223 on the rotary switch 29 and switch contact I-253 on the rotary switch 31 are connected respectively by conductors I-224 and I-254 to the external bus 17. Switch contact I-225 on the rotary switch 29 and switch contact I-255 on the rotary switch 31 are connected respectively by conductors I-226 and I-256 to switch contacts G-63 and G-64 of the rotary switch 81 of the gate 9. Switch contact I-257 of rotary switch 31 is connected by the conductor C-61 to the terminal socket P-61 of the patchboard 4 of FIG. 3.

An important function of the output indicator 7 is to measure and monitor the electrical quantity being applied at the output of the module under test M. Under normal test operations, output from the module M is available on the B bus 12 through the operation of the appropriate toggle switch in the A-B selector switch bank 5, which in turn is connected by conductors on the patchboard 4, socket panel 3, and socket adapter 11 to the module under test. In such normal test operations the output indicator 7 has the positive side of the meter 27 connected through the central arm I-193 of rotary switch 29 to the switch contact I-217 which is connected by the conductor I-218 to the B bus 12. The negative side of the meter 27 may in turn be connected through central arm I-195 of the rotary switch 31 to switch contact I-249 which is connected to the common bus 18, and with the range selector switch 115 set to the appropriate voltage scale. In addition to monitoring the output signal of the output under test, the output indicator 7 performs other functions, such as calibration of the voltages of the power supply and to measure other quantities in the module tester.

COMBINED INPUT AND OUTPUT METER MOVEMENTS

It is to be noted that both the input and output indicators 6 and 7 employ separate meter movements 23 and 27 respectively. The two meters are a basic feature of the universal module tester. Each meter may measure D.C., or average voltage or current in the usual fashion, but a feature of the universal module tester is that the two meters 23 and 27 may be viewed *simultaneously* while their values are *changing*.

Figure 10:
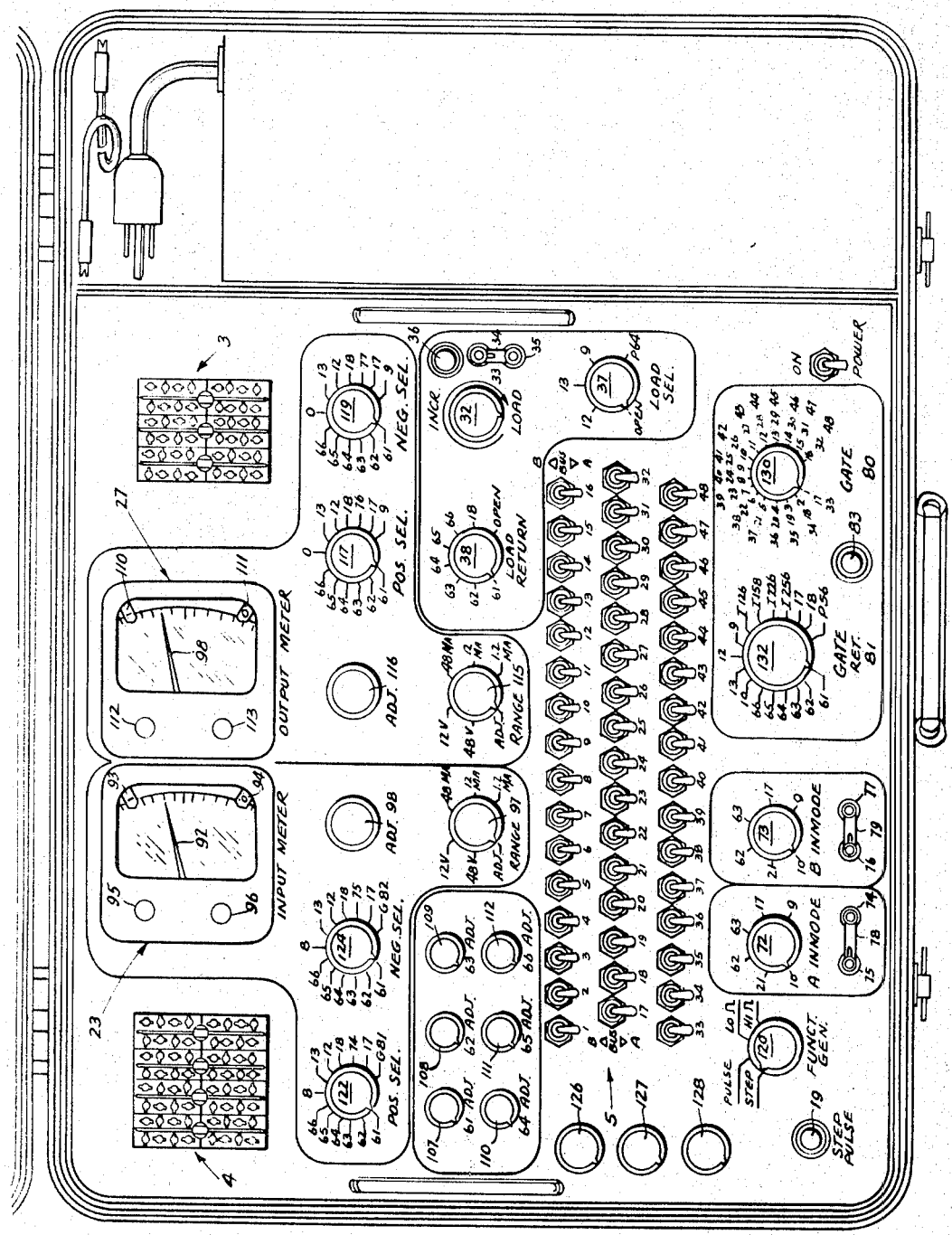
FIG. 10 is a front panel drawing of a universal module tester embodying the subject matter of the invention.

The meters are located adjacent to each other, and oriented sidewise to facilitate simultaneous viewing as is shown in a front panel drawing of FIG. 10.

Changes in the meter readings—which may represent on one meter 23 a change in the input being applied to the module under test, while the other meter 27 is indicating the changes in the output of the module due to the variations of the input signal—give a picture of the dynamic operation of the module.

This ability to display simultaneously changes in output from the module due to changes of input is essential to the full use of the invention. The universal module tester is a powerful tool, placed in the hands of an imaginative and skillful operator, a wealth of information can be obtained about the operating efficiency of a module.

FEATURES OF THE METER MOVEMENT

Additional features of the meter system include the following. The indicator needles 92 and 98 normally take an upward motion to show a *positive going* step or low frequency signal, and follow a downward motion to show a negative going step or low frequency signal. The flags 93 & 94, and 110 & 111, are manually positioned to indicate the logical "zero" and logical "one" binary levels. The flags are reversible, i.e. they can crossover each other, to reference so-called "negative logic" as well as positive logic. Thus, the display on the meters conforms to textbook presentation of binary levels.

The meters are connectable to various potentials within the universal module tester so that each meter may simultaneously display both the bias and the signal of the module; with one flag referencing the bias or one of the logic levels, and the other flag referencing the other logic level equal to maximum output signal level plus bias level.

Moreover, the meter being an extremely accurate measuring device, it can detect and measure drift in the output of a module under test, for example, the drift in an emitter follower module.

The features of (1) two meters, (2) oriented side wise, (3) adjacent to each other, (4) with two position flag indicators on each meter, (5) able to crossover each other, and (6) switching circuitry so that each meter can simultaneously display both bias and signal, are important features of the invention.

GATE

Figure 9:
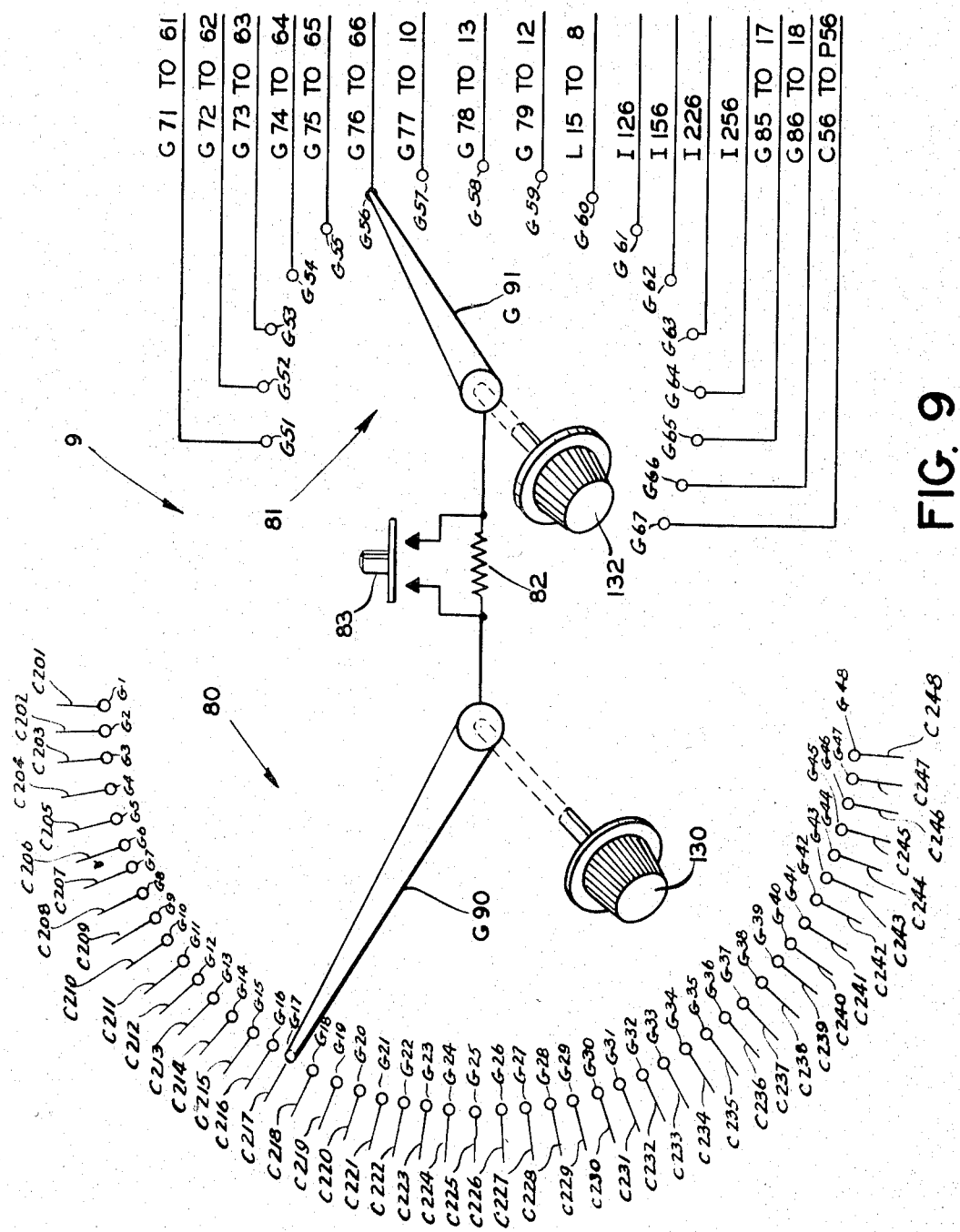
FIG. 9 is a detailed schematic drawing showing the gate of FIG. 1.

The universal module tester also includes a gate represented by a block bearing the legend 9 in FIG. 1 and shown schematically in detail in FIG. 9. The gate affords a direct random access to any socket on the socket panel (i.e. any terminal of the module under test). The gate comprises two rotary switches 80 and 81 connected together back to back. The first rotary switch 80 has 48 switch contacts bearing the legends G–1 through G–48 to the center switch arms TC–1 through TC–48 of the 48 toggle switches T–1 through T–48 in the A–B selector switch bank 5. Each switch contact G–1 through G–48 is connected to the center arm of the toggle switch bearing the corresponding number (TC–1 through TC–48) by the conductors C–201 through C–248. The first two connections and the last connection are traced in detail below, it being understood that the remaining 46 connections are analogous. Switch contact G–1 is connected by conductor C–201 to the center arm TC–1 of toggle switch T–1 of the A–B selector bank 5. Switch contact G–48 is connected by conductor C–248 to the center arm TC–48 of toggle switch T–48 on the A–B selector bank 5. Likewise, the remaining 46 switch contacts are connected to corresponding toggle switches on the A–B selector rack 5.

The other rotary switch 81 in gate selector 9 has 17 switch contacts G–51 through G–67 arranged in selective operative relation to switch arm G–91 and connected by conductors to various sources of excitation, potentials and reference points throughout the tester, and to the indicators 6 and 7.

In particular, and referring to the schematic drawing shown in FIG. 9, switch contact G–51 is connected by conductor G–71 to terminal 61 of the power supply 1. Switch contact G–52 is connected by conductor G–72 to terminal 62 of the power supply 1. Switch contact G–53 is connected by conductor G–73 to terminal 63 of the power supply 1. Switch contact 54 is connected by conductor G–74 to terminal 64 of the power supply 1. Switch contact 55 is connected by conductor 75 to terminal 65 of the power supply 1. Switch contact 56 is connected by conductor G–76 to terminal 66 of the power supply 1. Switch contact 57 is connected by conductor 77 to the output of the function generator available on the function generator bus 10. Switch contact G–58 is connected by conductor 78 to the A bus 13. Switch contact G–59 is connected by conductor G–79 to the B bus 12. Switch contact G–60 is connected by conductor L–15 to the load 8 of FIG. 2.

Switch contact G–61 is connected by conductor I–126 to switch contact I–125 of rotary switch 24 which may be selectively connected by switch arm I–48 to the positive side of meter movement 23 of the input indicator 6 by conductor I–50. G–62 of the gate 9 may be selectively connected to the negative side of the input indicator 6 through a conductor I–156 leading to switch contact I–155 of rotary switch 25. Switch contact G–63 may be connected to the positive side of output indicator 7 through a conductor I–226 leading to switch contact I–215 of switch 29. Switch contact G–64 is connected to the negative side of the output indicator 7 through conductor I–256 leading to switch contact I–255 of switch 31. Switch contact G–65 is connected by conductor G–85 to the external bus which is connected to the external terminal 17. Switch contact G–66 is connected by conductor G–86 to the common bus 18. Switch contact G–67 is connected by conductor C–56 to socket P–56 on the patchboard 4.

Rotary switch 80 and rotary switch 81 each have a selector arm G–90 and G–91 respectively. The terminals of each selector arm G–90 and G–91 are connected to each other through a resistor 82, of for example 2000 ohm resistance, which may be shorted out by operation of an operator-operative momentary push button switch 83. The resistor 82 is included to prevent the power supplies or other potential from being accidentally shorted during switching.

By selectively connecting the selector arms G–90 and G–91 of the rotary switches 80 and 81 to any of the terminals G–1 through G–48 and G–15 through G–67, various potentials may be applied to the module under test, since the terminals G–1 through G–48 on rotary switch 80 connect to the switch arms TC–1 through TC–48 on the toggle switches T–1 through T–48 which are in turn directly wired by conductor C–101 through C–148 to the terminals of sockets P–1 through P–48 in the patchboard 4 which are in turn directly connected by conductors C–1 through C–48 to sockets S–1 through S–48, respectively, which have plugged into them the pins on the socket adapter 11 which in turn are directly electrically connected to the pins of the module under test. Besides applying a variety of potentials to the particular terminal of the module under test, the gate selector may be used to connect a particular module to the indicators 6 and 7, to the load 8, and to externally connect with a suitable measuring instrument such as an oscilloscope (not shown).

PANEL ASSEMBLY

FIG. 10 is a front panel drawing of a typical universal module tester showing the input meter 23 and output meter 27, socket panel 3, in which is to be plugged a socket adapter 11 (not shown in this figure), patchboard 4, an array of 48 toggle switches T–1 through T–48 on the A–B selector bank 5 and various other knobs which may be adjusted by the operator to effect the desired tests on a module plugged into the universal module tester. The legends on each of these knobs agrees with the legends on the schematic and block drawings of FIGS. 1–9.

Particular attention is again directed to the two meters 23 and 27. It being noted that the meter movements are placed next to each other and sideways so that a positive indication is effected above the horizontal position of the indicator needles 92 and 98 and a negative indication is effected below the horizontal position of the indicator needles 92 and 98 which are accurately adjusted in cooperative relation with suitable indicator indicia on the indicator dials in the usual manner. The flags 93 and 94 on meter 23; and flags 110 and 111 on meter 27 are adjusted to the logical zero and logical one level positions. Operator-operative knobs 95 and 96, and 112 and 113 are effective through conventional operating means to manually position these flags.

Although only one embodiment of the universal module tester has been shown it is seen that this tester is a universal test set. The universality of the test set is satisfied in that this instrument tests different types of digital module regardless of the socket shape, the number of pins, the pin configuration, the multiple voltage requirements, step and pulse signal amplitudes, pulse polarity, binary position levels, and types of logic. In particular, the socket requirement of shape, number of pins and configuration is satisfied by the adapter 11. Multiple voltage requirements are satisfied by continuously variable power supply 1. The steps and pulse signals are supplied by the function generator 2 having amplitude control and polarity control whereby to supply the binary levels, which are then measured on the input and output indicators 6 and 7. Thus it is seen the present embodiment is truly a universal test set.

FLIP FLOP CIRCUIT TEST OPERATIONS

To illustrate the operation and interrelation of the parts in the universal module tester as described, there is described hereinafter a preferred method of testing two typical computer logic modules: a flip-flop circuit and a pulsed multiple input AND gate circuit.

Figure 11:
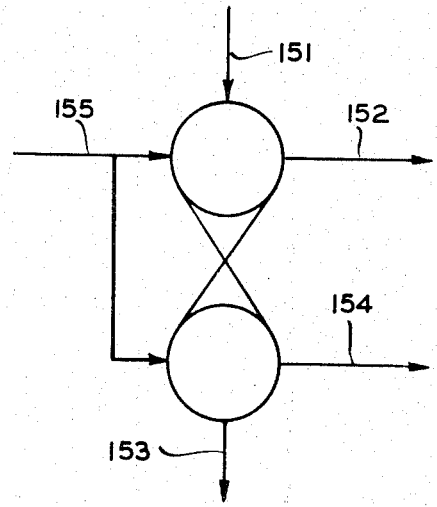
FIG. 11 is a block diagram representing a flip-flop to be tested by the module tester.

The block diagram shown in FIG. 11 represents a bistable multivibrator also known as an Eccles-Jordan circuit or a flip-flop circuit. It is a two tube or two transistor regenerative circuit which can exist indefinitely in either of two stable states and can be caused to make an abrupt transition from one state to the other in response to a signal. The flip-flop circuit is basic in computer operations, and finds extensive application in pulse circuitry. It is used not only for the generation of square waves from pulses, but also for the performance of certain digital operations such as counting and dividing by two.

The operation of the flip-flop is elementary. A detailed description of the basic, and several refined, flip-flop circuits and their functions can be found in electrical engineering text books; reference being made to Pulse and Digital Circuits by Millman and Taub, and cited material therein for those who wish to examine the flip-flop circuit itself.

In FIG. 11, a basic flip-flop is shown having five terminals or pins: pin 151 is to receive power, pin 153 is for connection to common or ground, pins 152 and 154 are the two output pins, and pin 155 is an input pin for receiving a signal.

The flip-flop circuit may be plugged into a socket adapter which is similar to the type shown in FIG. 4 having a socket head 42 adapted to receive and mate with the particular terminal configuration of the pluggable module in which the flip-flop circuit is encapsulated or on which the flip-flop is mounted. The socket adapter 11 is plugged into socket 3 of the panel of FIG. 10 whereby the five pins 151, 152, 153, 154 and 155 of the flip-flop are connected respectively to the first five sockets P–1, P–2, P–3, P–4 and P–5 on the patchboard 4.

At the patchboard 4, a jumper 58, as shown in FIG. 6, may be connected from the pin of socket P–1 to the pin of socket P–49 which is connected to terminal 61, an output of the adjustable power supply 1 so as to connect output 61 to the pin 51. This connection is shown on FIG. 3 by the jumper J–1. The power supply output 61 is adjusted to a magnitude and polarity as required for proper operation of the flip-flop by an operator-operative knob 107 shown on the panel of FIG. 10 and operatively connected to suitable means to adjust the power supply 1 and the magnitude and polarity of the output 61 thereof and which adjusted means may be of conventional structure or may embody the novel structure disclosed and claimed in a U.S. Pat. No. 3,263,195, granted July 26, 1966; U.S. Pat. No. 3,254,291, granted May 31, 1966; and U.S. Pat. No. 3,247,445, granted Apr. 19, 1966; all of which patents have been granted to Carroll B. Vaughan, the inventor of the present invention. Other operator-operative knobs 108, 109, 110, 111, and 112 are arranged to operate similar means to adjust the power supply 1 and the magnitude and polarity of the outputs 62, 63, 64, 65 and 66, respectively.

A second jumper J–2, as shown in FIG. 3, may be connected from the pin of socket P–55 which is wired to the common bus 8 to the pin of socket P–3 to effectively connect pin 153 of the flip-flop to the common bus 18. Thus the external power requirements of the modules are satisfied.

Meter 27 of output indicator 7 is connected to an appropriate resistor element in bank 28 selected by adjustment of the operator-operative knob 115 and 116 so as to have a voltage range scale capable of fully measuring a magnitude equal to the usual output of the flip-flop circuit under test. The rotary switches 29 and 31 may be adjustably positioned by suitable operator-operative knobs 117 and 119 so that switch arms I–193 and I–195 close switch contacts I–215 and I–249, respectively, to connect the output meter 27 across the B or out bus 12 and ground or common bus 18. The flag indicators 110 and 111 are positioned to logic "one" and logic "zero" levels which indicate the proper magnitude level of the outputs.

TEST OPERATION I

The universal module tester is now ready for a first test of the flip-flop circuit. The second toggle switch T–2 in the A–B selector switch tier 5 may then be operated by the operator to an "up" position and thereby connect output pin 152 of the module under test to the B bus 12. By alternately operating the second toggle switch T–2 and the fourth toggle switch T–4 the output of the flip-flop is impressed on the output meter 27 of the output indicator 7. For a flip-flop in a normal operative condition, the output meter 27 will indicate a voltage of the appropriate magnitude also equal to the logic "one" level at one of the output pins 152 or 154 and a voltage (of logic "zero" level) at the other output pin (154 or 152). This corresponds to one tube or transistor of the flip-flop being in a conducting state and the other in a non-conducting state.

TEST OPERATION II

For the second test on the flip-flop, an input signal is applied to the flip-flop at its input terminal pin 155 by the function generator 2. The wave form generator 2A is first conditioned by appropriate adjustment of the operator-operative knob 120 so as to provide an output pulse on the output bus 10. The inmode selector switch 15 of FIG. 3 is then adjusted by the operator-operative knob 72 so as to connect the output of function generator 2 of FIG. 1 available on bus 10 and at switch contact S–73 on the switch 15 through the selector switch arm 70 to the A bus 13. The fifth toggle switch T–5 on the A–B selector switch bank 5 is then operated to the "down" position to make contact with the A bus 13, and thus connecting the function generator output of bus 10 to the input pin 155 of the flip-flop. Switch 19 on the function generator 2 is operated by the operator so as to apply a single pulse to the input pin 155 of the flip-flop through the output line 10. Simultaneously, the output meter 27 of the output indicator 7 should indicate a reversal of the conduction state, namely, if output indicator 27 monitoring the output of the pin 152 is, for example, nonconducting (logic "zero") with the indicator 98 at flag 110 prior to the application of input signal, then upon the application of the input signal the indicator 98 should be positioned to the conducting state (logic "one") level indicated by the flag 111 and which change would be indicated on the indicator meter 27. The converse is true if output pin 152 was in a conducting state. And the same is likewise true if the output indicator was monitoring the other output of the flip-flop pin 154.

TEST OPERATION III

In the next test performed on the flip-flop, a low frequency signal may be applied to the input pin 155 of the flip-flop from the function generator 2 by first adjusting the operator-operative knob 120 so that the wave form generator 2A may effect a low frequency signal. The input indicator meter 23 then operatively connected so that in the third test operation, both the input to and the output from the flip-flop, as indicated by the indicator pointers 92 and 98, are viewed simultaneously, one on the input meter 23 and the other on the output meter 27. Thus so called "dynamic operation" or "dynamic testing" of the flip-flop is performed. Attention is called to the simplicity of manipulation required in the universal module tester, and the simplicity and definiteness of test record.

In the third test operation the input meter 23 of input indicator 6 is adjusted through shunting and series resistor elements in bank 26 to a voltage scale by the range selector knob 97 so that the meter 23 is capable of fully measuring the voltage magnitude according to the usual input signal applied to the flip-flop. The meter 23 is then connected by an adjustment of an operator-operative knob 122 positioning selector arm I–48 of rotary switch 24 so as to close switch contact I–115 and an adjustment of an operator-operative knob 124 positioning selector arm I–12 of rotary switch 25 to terminal I–149 to the A bus 13 and to common 18 respectively so as to be able to monitor the input signal as it is applied to the flip-flop.

TEST OPERATION IV

In a fourth test operation the function generator 2 is adjusted by the operator-operative knob 120 so as to cause the wave form generator 2A to apply an input signal of a square wave form having a frequency of one cycle per second. The input needle 92 on the meter 23 will in response thereto move back and forth, for each cycle of the input signal.

The output indicator 27 is connected as before to one of the output terminals e.g. pin 152 of the flip-flop; and the output indicator needle 98 (during the application of a one cycle per second at the input pin 155) will be seen to flip and flop back and forth at one half the frequency of input signal. This will then indicate the binary division capability of the flip-flop.

TEST OPERATION V

The output indicator 27 is then connected to the other output (e.g. pin 154) of the flip-flop by disengaging toggle switch T–2 from the B bus 12 and engaging toggle switch T–4 with the B bus 12. A proper functioning flip-flop should indicate a loss of one cycle at the switching and then have the needle 98 on meter 27 flip and flop back and forth at half the frequency of the input signal. Thus the low frequency operation of the flip-flop is tested.

TEST OPERATION VI

With the connections as described above, the amplitude of signal applied at the output line 10 through the attenuator 20 may be adjusted by an operator-operative knob 126 to adjust conventional attenuation means in the attenuator 20. It is observed that as the input signal is reduced more and more, a minimum of input signal is reached which is not sufficient to trigger the flip-flop. This is the so called minimum trigger level required to move the circuit from one stable state to the other.

TEST OPERATION VII

In a final test, the high frequency characteristics of the flip-flop may be examined by appropriate adjustment of the operator-operative knob 120 so as to cause the wave form generator 2A to apply a high frequency square wave signal of 200 kilocycles to the input of the flip-flop which will in turn be monitored on input meter 23 of input indicator 6. As the meter movement 23 has an inertia, the meter 23 will indicate a constant amplitude equal to the D.C. value of the input signal.

The output indicator 27 is connected by appropriate operation of the toggle switch T–2 or T–4 on switch bank 5 to either output of the flip-flop. The meter 27 will indicate a constant value which is the D.C. value of the high frequency output of the flip-flop due to inertia of the meter movement. The input signal is gradually reduced to determine the minimum trigger level required for high frequency triggering. Some jitter is noticeable at the output, as the minimum trigger level is approached.

Thus the simplest flip-flop circuit is tested for (1) to determine that each half of the flip-flop conducts while the other half is non-conducting, (2) to determine that the circuit flips and flops on the aplication of a signal, (3) to determine that the circuit will flop and flop for a periodic signal (binary division), (4) to determine minimum trigger level at low frequency, (5) to observe the flip-flop operation at high frequency, (6) to determine the minimum trigger level for high frequency operation.

Only the most basic testing of the basic flip-flop has been described above. Other tests may be performed on the flip-flop to measure particular features of the module such as clamping.

Another marginal testing of the flip-flop including varying the rise time of the applied signal, and applying a series of spikes to the flip-flop of decreasing energy level until a minimum amount of energy to trigger the flip-flop is arrived at.

AND CIRCUIT TEST OPERATION

Figure 12:
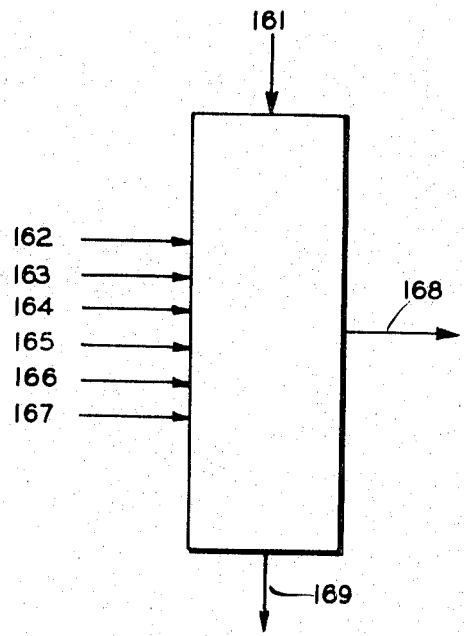
FIG. 12 is a block diagram of an AND circuit to be tested by the module tester.

For a second example, the parts and operation of the universal module tester are illustrated by the test of an AND circuit shown in a block diagram in FIG. 12. The AND circuit, also called a coincident circuit, has two or more inputs, to each of which is applied a pulse of common polarity. The circuit has a single output at which a pulse appears if and only if a pulse is applied simultaneously to all inputs. If the input pulses are not of the same time duration, the output pulse will appear during the time interval that the input pulses overlap.

The AND circuit to be tested has six inputs and is shown schematically in FIG. 12. Legends 162 through 167 represent the input terminals or pins that are adapted to receive the input pulses. Legend 161 represents the terminal or pin that is to be connected to power supply. Legend 168 represents the output terminal, and legend 169 represents the terminal to be connected to the common bus 18.

The AND circuit, for example, may be mounted on a printed circuit card having 9 spade pin terminals. The plug-in adapter 11 for use with this type of printed circuit card has a socket head adapted to receive the 9 pins of the printed circuit card. These pins or terminals of the module under test are electrically connected to the first 9 sockets P–1 through P–9 on the patchboard 4 through the conductors and the socket adapter body to the array of pins on the socket adapter 11 which may be plugged into the sockets on the socket panel 3 and which are wired by conductors C–1 through C–9 to the sockets P–1 through P–9 on the socket panel 4. As pointed out in the description of the universal module tester itself, the wiring between the terminals on the socket head of the adapter 11 and the sockets on the patchboard 4 are in a one to one relationship so that a pin plugged into the first socket on the socket head is electrically connected to the first socket P–1 on the patchboard 4; and likewise for the second socket, and the other sockets.

At the patchbord 4, a jumper is connected from the pin of the power supply socket P–49 to the pin of the socket P–1; and the adjusted voltage available at the socket P–49 is adjusted to supply a voltage of necessary amplitude and polarity to furnish the external power requirements of the AND module. A second jumper is connected from the common pin P–55 on the patchboard 4 to the socket P–9 thus connecting the module pin 169 to the common bus 18.

The function generator 2 is adjusted for a high frequency pulse train of 200 kilocycles by appropriate adjustment of the operator-operative knob 120 and this signal is fed through the function generator bus 10 to the inmode selector switch 15 which by adjustment of the operator-operative knob 72 effects closure of the switch control C–73 by the selector arm 70 so that the pulse train is fed into the A bus 13.

The input indicator meter 23 is connected from the A bus 13 to the common bus 18. The positive side of the input indicator 23 is connected through rotary switch 24 by adjustment of the operator-operative knob 122 so as to cause the switch selector arm I–48 to close switch contact I–115; and the negative side of the input indicator 23 is connected to common bus 18 by adjustment of the operator-operative knob 124 so as to cause the switch selector arm I–12 to close switch contact I–149. The range switch of the bank 26 is operated by knob 97 to a range so that the average value of the signal from the function generator 2 can be readily measured on the meter 23.

The output indicator 27 is connected from the B bus 12 to common bus 18 by the operation of rotary selector switches 29 and 31 by the operator-operative knobs 117 and 119. The B bus 12 being connected to the positive side of the meter 27 by selector switch arm I–193 closing switch contact I–217 while the common bus 18 is connected to the negative side of the meter 27 by selector switch arm I–195 closing switch contact I-149. The resistor in the bank of series and shunting resistors 28 is selected by operation of the range knob 115 so that the output indicator meter 27 is on the same scale as the input indicator meter 23.

The second through seventh toggle switch T–2 through T–7 on the A–B selector switch bank 5 are operated "down" to make connection with the A bus 13 and thereby effectively applying the pulse train input to the six input terminals 162, 163, 164, 165, 166, and 167 of the AND module. The eighth pin 168 of the module is connected to the B bus 12 by operation of the eight toggle switches T–8 to the "up" position. The input applied on the A bus 13 is monitored on the input indicator 6 and the output available at pin 168 as monitored on the output indicator 7. A normally operative AND gate will show equal D.C. displacement of both input and output indicators.

Moreover to perform additional tests on the AND gate switch T–2 of the A–B selector switch bank may be operated to the central or neutral position to withdraw the input from one (e.g. 162) of the 6 inputs. A normally operative AND gate will indicate no output upon the withdrawal of the input at pin 162. The input signal is then reapplied at pin 162 by operation of switch T–2 "down" and withdrawn on the input pulses from pin 163 by operation of switch T–3 to center, again there should be no output signal on pin 168 which is monitored on indicator 7. This procedure is repeated for all 6 input pins of the AND module. Next, an input signal is withdrawn from pin 162 and 163 by moving switches T–2 and T–3 to center and no output should be observed on the indicator 7. This procedure is then repeated by withdrawing the input signal from pin 162 and 164; 162 and 165; 162 and 167; 163 and 164; etc. for all of the 6 factorial permutations of the input terminals.

To insure an input signal is applied at a pin when its corresponding toggle switch on the A–B selector switch bank is in position, the gate selector switch 9 is used. The selector switch arm G–90 of the rotary switch 80 may be set by adjustment of an operator-operative knob 130 to select the pin whose input is to be monitored and the selector switch arm G–91 of the rotary switch 81 may be set by operator-operative knob 132 so as to close switch contact I–125 of the switch 24 which may be closed by selector switch I–48 upon appropriate adjustment of knob 122 so that the positive side on indicator 23 is disconnected from the A bus 13 to which it was formerly connected and by the operation of the selector switch arm I–49 so as to close switch contact I–125, the signal applied to the particular pin selected by the operation of the knob 130 will thereupon be monitored on the meter 23.

Only two very simple examples have been given illustrating the operation of the universal module tester. More sophisticated testing and more complicated circuits, and combinations of circuits on a single module, require a more elaborate test procedure. The two examples describe a test procedure to be performed on the external terminals of the module. Tests may also be performed for continuity and for malfunctioning of a particular part of the circuit by probing inside the module with a probe connected for example at terminal plug 17. Tests may also be performed on the universal module tester itself for both continuity of and for calibration of meters and of the internal wiring impedances. Preferred methods of such testing will become apparent to those skilled in the art once they are fully familiar with the universal module tester.

While only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A universal tester for dynamic and static tests on the operating efficiency of electrical apparatus such as electronic modules having a multiplicity of terminals comprising: a housing, means on said housing for establishing separate electrical contacts with each of said terminals, means for generating a plurality of adjustable electrical excitations; a pair of indicators, each of said indicators including two marker flag indicators manually positionable to reference particular locations of an associated indicator needle corresponding to two predetermined levels of operation of the tested apparatus, said marker flag indicators being operatively arranged to cross over each other to reference reversed levels of operation of the tested apparatus, said pair of indicators being arranged on said housing in juxtaposition one to the other and oriented on their side so that they may be viewed simultaneously by the operator; each indicator being connected across a shunting network including operator-operative means for effecting selective insertion in series and in parallel connection with said indicator an appropriate impedance to selectively convert the indicator into an ammeter or a voltmeter with full scale range in accordance with possible variations of the quantity under measure; said indicators being selectively connectable to appropriate electrical contacts, each indicator measuring an electrical quantity in relation to a corresponding terminal, one of said indicators being appropriate to the input of the tested apparatus and another to the output thereof, and a plurality of switches for selective connection between the indicators, the electrical contacts and the electrical excitations, said plurality of switches including first switching means for selectively applying the plurality of excitations to input terminals of the apparatus under test, second and third switching means for respectively and selectively connecting said one indicator so as to monitor the excitation applied to the input terminals of the tested apparatus, and said other indicator so as to monitor the electrical energy at the output terminals of the apparatus; and an adjustable load, including an adjustable resistor, having at one end a fourth switching means to connect selectively the various terminals of the tested apparatus to said load, and at its other end a fifth switching means to connect said load to a reference potential.

2. A tester as claimed in claim 1, wherein said generator means includes a power supply producing a plurality of independently and continuously adjustable direct-voltages of both positive and negative polarities.

3. A tester as claimed in claim 2, wherein said generator further includes a floating function generator operable to generate different wave forms, including a step voltage, a pulse of voltage; a low frequency square wave; a high frequency square wave; a low frequency pulse train.

4. A tester as claimed in claim 3, wherein said function generator further includes an attenuator to adjust the amplitude of the generated wave.

5. A tester as claimed in claim 4 including operator-operative means to adjust the operating characteristics of said generator.

6. A tester as claimed in claim 1, wherein each indicator comprises in its input terminal as well as in its output terminal switching means for selectively connecting said indicator to the appropriate terminals of the apparatus under test to monitor an electrical quantity in relation to said terminals.

7. A tester as claimed in claim 1, wherein said first switching means comprises a double rotary switch including first and second selector arms electrically connected to each other through another resistor for enabling direct random access to any terminal of the tested apparatus by means of the first selector switch arm and application of various potentials by intermediary of said second selector switch arm.

8. A tester as claimed in claim 8, wherein said other resistor may be shorted out by operation of an operator-operative momentary push button switch.

9. A tester as claimed in claim 1 which comprises a socket panel including a plurality of individual sockets for establishing separate electrical contacts with each terminal of said tested apparatus, and sixth and seventh switching means for selectively applying appropriate electrical excitations to the selected electrical contacts.

10. A tester as claimed in claim 9, wherein the connection between said tested apparatus and said socket panel includes an adapter to connect the tested apparatus to the tester.

11. A tester according to claim 9, which further comprises a selector switch bank comprising a number of single pole double throw switch members equal to that of the individual sockets, the pole of each said switch member being connected to a corresponding socket, and said switch members enabling the supply of an appropriate potential to each terminal of the tested apparatus.

12. A tester according to claim 7, wherein said double rotary switch comprises a number of contacts selectively operable by the first selector arm, said number of contacts being equal to that of the single pole double throw switch members in said selector switch bank and each contact being directly connected electrically to the pole of a corresponding switch member.

13. A tester according to claim 11, which further comprises at least two groups of common conductors supplying reference voltages inside the housing of said tester, each switch member of said selector switch bank being operable to electrically connect an individual socket with a desired common conductor.

References Cited

UNITED STATES PATENTS

| | | | |
|---|---|---|---|
| 600,981 | 3/1898 | Weston | 324—114 |
| 625,843 | 5/1899 | Jones | 200—56 |
| 2,850,699 | 9/1958 | Davidson | 324—158 |
| 2,982,916 | 5/1961 | Loesch | 324—158 |
| 3,034,051 | 5/1962 | Higgens, Jr. | 324—73 |

RUDOLPH V. ROLINEC, Primary Examiner

R. J. CORCORAN, Assistant Examiner